United States Patent
Wagner

[15] 3,679,033
[45] July 25, 1972

[54] PROPELLER COUPLING

[72] Inventor: Douglas A. Wagner, Indianapolis, Ind.

[73] Assignee: General Motors Corporation, Detroit, Mich.

[22] Filed: Nov. 30, 1970

[21] Appl. No.: 93,605

[52] U.S. Cl................192/48.7, 74/665 F, 192/53 B, 192/114, 244/17.21, 416/169, 416/170
[51] Int. Cl........................................F16d 23/04
[58] Field of Search..............192/48.7, 53 F, 53 B; 416/169, 416/170; 244/17.21; 74/665 F

[56] References Cited

UNITED STATES PATENTS

| | | | |
|---|---|---|---|
| 3,063,529 | 11/1962 | Cook | 192/53 B |
| 2,217,883 | 10/1940 | Anderson | 416/169 X |
| 776,404 | 11/1904 | Keyser | 192/53 B |
| 2,698,147 | 12/1954 | Hovgard | 416/170 X |
| 3,300,004 | 1/1967 | Peterson | 192/53 F X |

*Primary Examiner*—Allan D. Herrmann
*Attorney*—Jean L. Carpenter and Arthur N. Krein

[57] ABSTRACT

A hydraulic actuated propeller coupling for use in a helicopter type aircraft to selectively couple or uncouple a propeller to the output of a gas turbine engine normally used to drive a helicopter rotor.

5 Claims, 4 Drawing Figures

Patented July 25, 1972  3,679,033
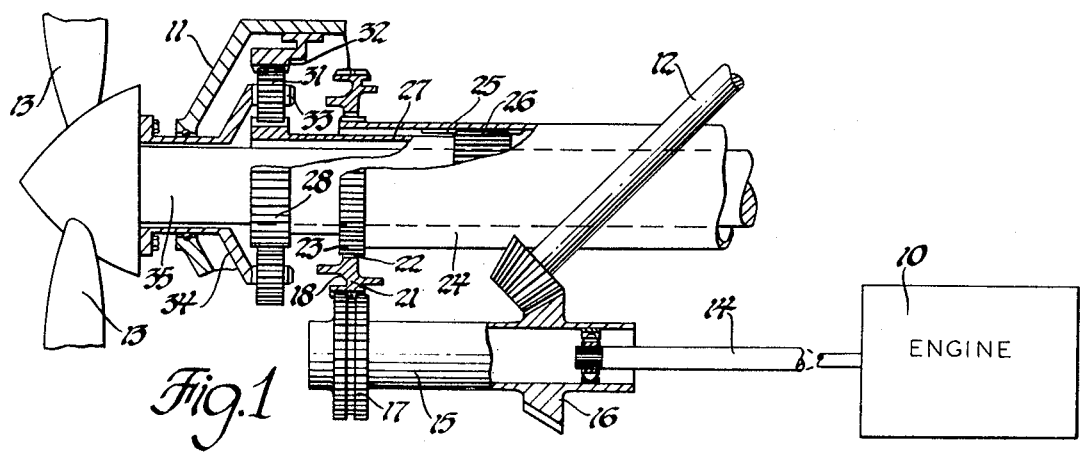
Fig.1
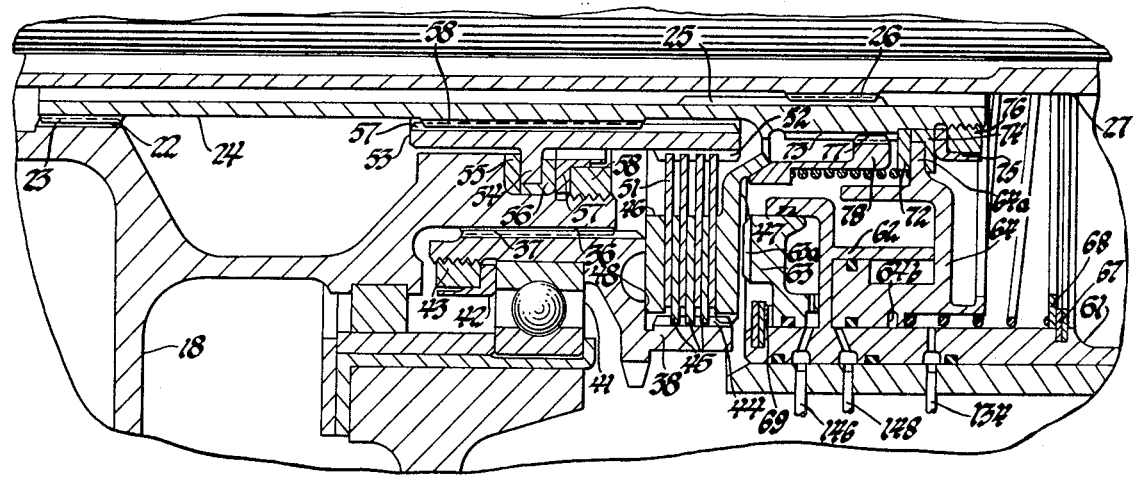
Fig.2
Fig.3
INVENTOR.
Douglas A. Wagner
BY
Arthur N. Krein
ATTORNEY

PROPELLER COUPLING

This invention relates to a propeller coupling and, in particular, to a propeller coupling arrangement whereby a propeller can be selectively driven by an engine normally driving a helicopter rotor, the propeller being driven when it is desired to obtain a forward speed greater than that obtainable by use of the helicopter rotor alone.

In conventional helicopter type aircraft, the forward speed of such aircraft is limited because the helicopter rotor is used both to provide lift for the aircraft and to effect forward progress of the aircraft. However, there are times when it would be obviously advantageous to operate such a helicopter type aircraft at forward speeds greater than that which could be achieved by the helicopter rotor itself.

Accordingly, it is the principal object of this invention to provide a propeller coupling arrangement for use on a helicopter type aircraft to selectively drive a propeller when desired while still permitting helicopter type mode of operation only, when desired.

Another object of this invention is to provide a propeller coupling arrangement which is hydraulically actuated to selectively couple a propeller to the output of a gas turbine engine.

Still another object of this invention is to provide a coupling arrangement between an input shaft and an output shaft in which a small torque force is applied through a clutch to synchronize the speeds of these shafts before effecting a positive drive interconnection between these shafts.

These and other objects of the invention are attained by means of a propeller coupling arrangement for use in a helicopter type aircraft to selectively effect coupling and uncoupling of a propeller shaft to the output of a gas turbine engine. The gas turbine engine normally drives a helicopter rotor through a drive gear train, which also includes a main drive gear and shaft which is selectively coupled to a sliding spline shaft to drive the propeller shaft through a conventional planetary gear drive train. In this arrangement, the propeller is windmilled to bring the propeller shaft to near synchronous speed with respect to the output of the gas turbine engine, at which time, a disc clutch is brought into operation to effectively complete synchronization and then a synchronous clutch is engaged to effect complete synchronization after which the spline shaft is moved into engagement with the main drive gear whereby the propeller is then driven by the gas turbine engine. These clutches are hydraulically controlled to effect coupling and uncoupling of the propeller shaft to the output of the gas turbine engine.

For a better understanding of the invention, as well as other objects and further features thereof, reference is had to the following detailed description of the invention to be read in connection with the accompanying drawings, wherein:

FIG. 1 is a schematic side view of the engine power plant and drive gear arrangement for a helicopter type aircraft for driving a main helicopter rotor, tail rotor and a propeller;

FIG. 2 is a sectional view of a portion of the gear case of FIG. 1 showing the propeller coupling arrangement of the subject invention, with parts in the propeller engaged position;

FIG. 3 is a sectional view of a lock mechanism for the propeller coupling arrangement of the invention; and, FIG. 4 is a sectional view similar to FIG. 3 showing the parts in the propeller disengaged position and the hydraulic system for effecting its operation.

Figure 4:
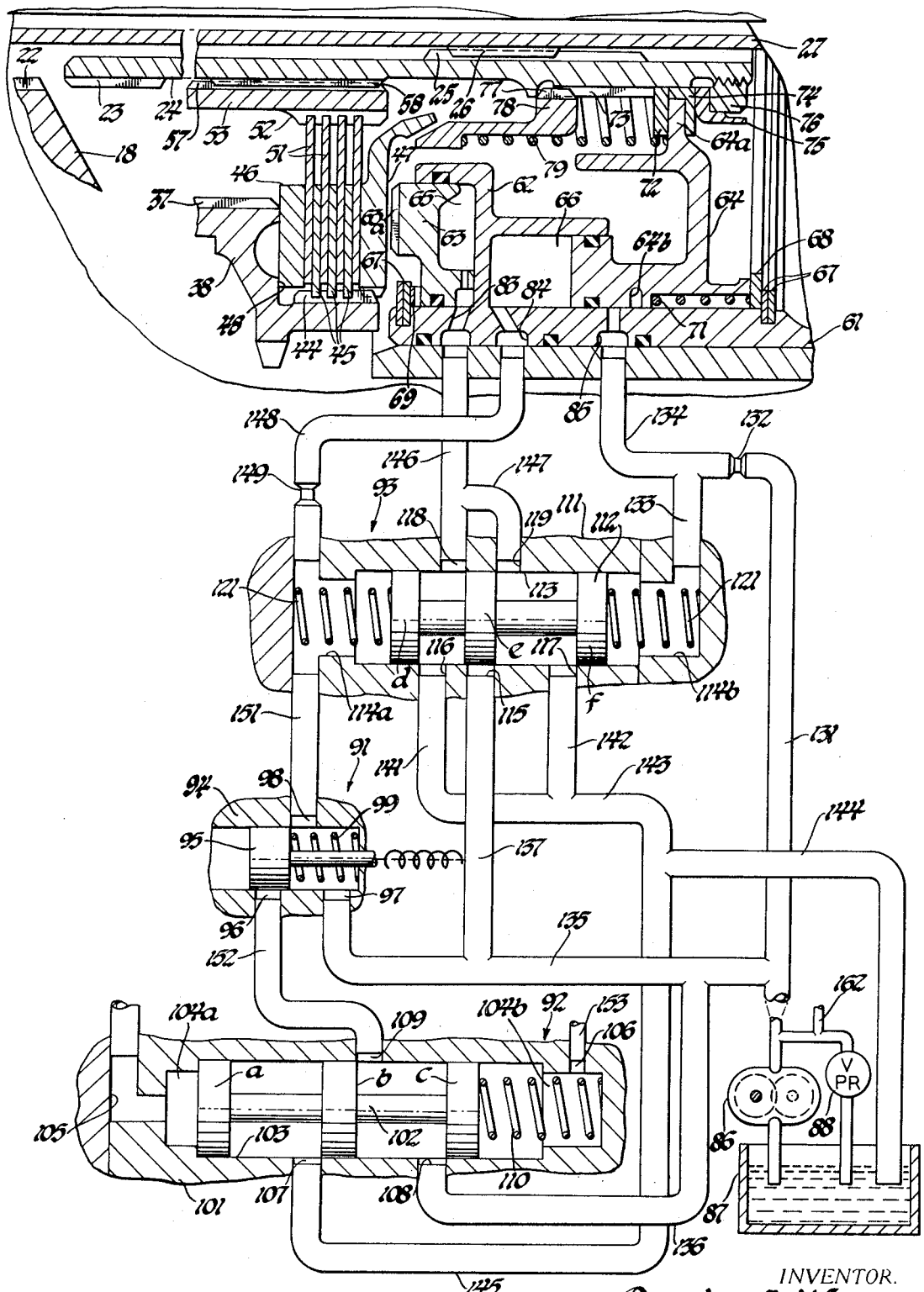

Referring to FIG. 1, an engine 10, such as a gas turbine engine, is connected through reduction gears in a gear casing 11 to drive a helicopter rotor and a tail rotor, not shown, through an angled drive shaft 12 and, above a predetermined forward speed of the aircraft, to drive a propeller 13. The gas turbine engine drives the rear end of a first or power input shaft 14 through any suitable coupling, not illustrated. The input shaft 14 is coupled in the conventional manner to a shaft 15 carrying the helicopter rotor drive gear 16 and the pinion 17 of a propeller shaft input gear train. As shown, pinion 17 drives an annular main drive gear 21 on tubular drive shaft 18 suitably journaled for rotation in gear casing 11. Drive shaft 18 is provided with a set of internal splines 22 engageable with the external splines 23 on an axially moveable hollow intermediate or spline shaft 24 through the coupling arrangement of the invention to be described.

Spline shaft 24 is provided with internal splines 25 engaging external splines 26 on a hollow driven shaft 27 to drive a sun gear 28 of a planetary gear set including planetary gears 31 and ring gear 32. The planetary gears 31 are rotatably journaled on trunnions 33 extending axially outward from a planet carrier 34 secured to the hollow propeller shaft 35 which is preferably integral with the hub of propeller 13. The nonrotating ring gear 32 is fixed to a portion of a gear casing 11 while the sun gear 28 is formed integral with the hollow driven shaft 27 telescoped over the propeller shaft 35.

Referring now to the subject matter of the invention, the splines 23 on the sliding spline shaft 24 are selectively moved into and out of positive driven engagement with the splines 22 on the drive shaft 18 by means of a disc clutch, a synchronous clutch and clutch actuating mechanism to be described whereby the sliding spline shaft 24 is first rotatably driven through the disc clutch to a speed corresponding approximately to the speed of rotation of the drive shaft 18 after which the synchronous clutch is used so that the actual coupling together of these shafts cannot be effected until the rotational speed of the spline shaft 24 is synchronized with the rotational speed of the drive shaft. The coupling and uncoupling of the propeller shaft with the gas turbine engine is initiated by the pilot of the aircraft, as desired, through the operation of a single control switch.

Specifically, as shown in greater detail in FIGS. 2 and 4, the drive shaft 18 is provided at one end with a set of external splines 36 which engage a set of internal splines 37 on a torque input member in the form of a clutch drive ring 38 journaled for rotation with the drive shaft 18 on the gear casing 11 by means of a fixed bearing 41 with the clutch ring being positioned axially by engagement of the inner race of the bearing 41 between a shoulder provided on the clutch drive ring and a retainer ring 42 fixed by screw ring 43 threaded onto one end of the clutch drive ring. At its other end, clutch drive ring 38 is provided with internal splines 44 drivingly engaged with torque input means including a plurality of stacked friction plates 45, a clutch backup ring 46 and a cone-faced friction drive ring 47 with the ring 46 abutting against a shoulder 48 of the clutch drive ring 38.

Interposed between the friction plates 45 and between these friction plates and the rings 46 and 47 are a second set of stacked friction plates 51 of a torque output means in the form of engaged with the external splines 52 at one end of a torque output member in the form of clutch driven ring 53 rotatably journaled with respect to the drive shaft 18 and axially positioned thereby by means of its radial flange 54 being slideably positioned between a bearing ring 55 abutting against a radial shoulder on the drive shaft 18 and an L-shaped bearing ring 56 held by retainer 57 and a nut ring 58 threaded to the end of the drive shaft 18. The clutch driven ring 53 has internal splines 57 of a length sufficient to be at all times engaged with the external splines 58 on the spline shaft 24. The clutch driven ring 53 of this disc clutch structure is used together with the windmilling effect of the propeller, to be described, merely to drive the spline shaft 24 up to a speed approximately equal to the rotational speed of the drive shaft 18.

Positioned adjacent to the last described disc clutch elements, to the right as seen in FIGS. 2 and 4, is a cylinder 61 fixed to gear casing 11, the cylinder 61 having a T-shaped internal flange 62 forming with a clutch actuating piston 63 and a spline actuator piston 64, a pair of variable sized chambers or piston cavities 65 and 66, respectively as seen in FIG. 4. The disc clutch actuating piston 63 is slideable in the cylinder 61 between the radial wall of flange 62 and a first set of split ring retainers 67 secured in a suitable groove provided in the left-hand end of a cylinder 61 with a wave washer 69 positioned therebetween to normally bias the actuating piston 63 to the right as seen in this figure. Clutch actuating piston 63 is provided at one end with annular bearing surface ring 63a for engagement with plain outboard face of friction ring 47. The piston 63 is thus axially shiftable and abuttable against the friction plates 45 and 51 to exert a clamp-up pressure on these friction plates to effect rotation of spline shaft 24 through clutch driven ring 53, these elements being referred to as the disc clutch as previously described.

In a similar manner, spline actuator piston 64 is slideable between the radial wall of flange 62 and a spring retainer ring 68 abutting against a second set of split ring retainers 67 spaced axially from the first set of split ring retainers, the spline actuator piston being normally biased to the left, as seen in FIGS. 2 and 3, by a spring 71 encircling a reduced portion of the spline actuator piston with one end of a spring abutting against this piston and the other end abutting against the spring retainer ring 68.

Spline actuator piston 64 is provided with a radially inward extending flange 64a by means of which it is secured to the spline shaft 24 to move it into and out of engagement with the drive shaft 18. Radial flange 64a is positioned between a bearing ring 72 abutting against the external splines 73 on the spline shaft 24 and an L-shaped bearing ring 74 held by retainer 75 and a nut ring 76 threaded to the end of the spline shaft 24 whereby as the spline actuator piston is moved axially within cylinder 61, it will move the spline shaft 24 axially with it.

The splines 73 on the spline shaft 24 are helical in configuration and are positioned to engage the internal helical splines 77 of a torque output means in the form of a friction driven ring 78 having a conical friction surface at its free end adapted to engage the conical friction surface of friction drive ring 47. The friction driven ring 78 is normally biased into frictional engagement, to the left as seen in FIGS. 2 and 4, with the friction drive ring 47 by means of a coiled spring 79 encircling the driven ring 78 with one end of the spring abutting against a shoulder of the friction driven ring 78 and its other end abutting against the actuator piston 64. These elements cooperating with friction ring 47 constitute the synchronous clutch previously referred to, the operation of which will be described in detail hereinafter.

Cylinder 61 is provided with through passages 83 and 84 and through vent passage 85, as shown in FIGS. 2 and 4, with the passages 83 and 84 positioned directly adjacent and on opposite sides of the radial wall of flange 62 for communication with chambers 65 and 66, respectively, while vent passage 85 is positioned to be selectively closed by the outer peripheral body of spline actuator piston 64 or to be opened to serve as a vent, as the reduced portion of this piston 64 overlies this vent passage.

Operation of the clutch actuator piston 63 and spline actuator piston 64, in a manner to be described, is effected by hydraulic fluid supplied by pump 86 from fluid sump 87 at a suitable operating pressure, the upper limit of which is controlled as by a pressure relief valve 88. The flow of hydraulic fluid to and from the passages 83, 84 and 85 is controlled by a pilot actuated valve, such as a solenoid valve 91, a Pitot pressure actuated valve 92 and a shuttle valve 93.

Solenoid valve 91 has a valve body 94 and a valve spool 95. The valve spool 95 is slideably disposed within a bore in the valve body to control fluid flow from either port 96 or 97 to a port 98 and is normally biased to a closing position with respect to port 96 by a spring 99.

Pitot pressure actuator valve 92 has a valve body 101 and a valve spool 102. Valve body 101 has a central bore 103 and reduced bores 104a and 104b on opposite sides thereof in communication with ports 105 and 106, respectively. The valve spool 102 has three equal size lands $a$, $b$ and $c$ equally spaced from each other and slideably received within the bore 103, with the central land $b$ being selectively moveable to place either port 107 or 108 in communication with the port 109. Spring 110 normally biases the valve spool to the left, the position shown in FIG. 4, while Pitot pressure admitted through port 105 is used to move the valve spool to the right against the biasing action of this spring.

The shuttle valve 93 has a valve body 111 and a valve spool 112. Valve body 111 has a central bore 113 and reduced stepped bores 114a and 114b on opposite sides thereof. The valve spool 112 has three equal size lands $d$, $e$, and $f$ slideably received within bore 113 with the center land $e$ being used to control the flow of fluid from a port 115 in communication together with ports 116, 117, 118 and 119 with the bore 113 in the valve body. The valve spool 112 is normally biased to the position shown in FIG. 4 by springs 121 acting on opposite sides of the valve spool 112.

As shown in FIG. 4, the discharge from the pump 86 is connected by a conduit 131 having an orifice 132 therein and by a conduit 133 to the bore 114b of the shuttle valve 93 and by conduit 134 to passage 85. In addition, conduit 131 is connected by a conduit 135 to port 97 of valve 91, by a conduit 136 to the port 108 of valve 92 and, by conduit 137 to port 115 of valve 93.

The ports 116 and 117 of valve 93 are connected by conduits 141 and 142, respectively, to a conduit 143 which in turn is connected to a return conduit 144 emptying into the sump 87. In a similar manner, the port 107 of valve 92 is connected by a conduit 145 to the conduit 144 for return of hydraulic fluid to the sump. Passage 83 is connected by conduits 146 and 147 to the ports 118 and 119, respectively, of the valve 93, while passage 84 is connected by a conduit 148, having an orifice 149 therein, to the bore 114a of valve 93 and by a conduit 151 extending therefrom to the port 98 in valve 91. Port 96 of this valve is then connected by a conduit 152 to the port 109 of valve 92. In addition, the port 106 of valve 92 is suitably connected by a conduit 153 to the sump 87 for the return of any hydraulic fluid which may leak across the land $c$ of the spool valve 102.

Since hydraulic fluid pressure from pump 86 is normally not available during starting of the gas turbine engine, a mechanical locking device is provided to hold the spline actuating piston 64, in the position shown in FIG. 4, to retain the spline shaft 24 out of driven engagement with the drive shaft 18.

Such a mechanical locking device is shown in FIG. 3 and includes a cup-shaped plunger housing 153 which may be formed as part of the gear casing 11 or as a separate element suitably secured thereto. The plunger housing 153 is closed at one end by cap 154 and slideably carries within a stepped bore 155 therein a plunger 156 carrying an upstanding lock pin 157. As seen in FIG. 3, plunger 156 is normally biased upward by a spring 158 whereby lock pin 157 is engageable in a lock slot 64b provided in the spline actuator piston 64. The chamber above the plunger 156 is in communication via a port 161 and conduit 162 to the discharge side of pump 86 whereby as the pump 86 operates to supply pressurized hydraulic fluid to the remaining control elements of the propeller coupling, the plunger 156 is moved downward against the biasing action of spring 158 to disengage the lock pin from the lock slot 64b to free the supply actuator piston 64. The stepped bore 155 is also connected via port 163 and a return conduit 164 to the sump 87 for return of hydraulic fluid passing around the periphery of the plunger 156 into the chamber below this plunger.

The above-described propeller coupling arrangement is for use in an aircraft employing a gas turbine engine to drive a main helicopter rotor and tail rotor, both not shown, plus, and at predetermined forward speed conditions, to drive a propeller to effect increased forward speed of the aircraft.

The propeller 13 is provided with a conventional variable pitch control mechanism, not shown, whereby the propeller blade angle can be varied, as required, including a blade angle position in which the propeller is feathered. In addition, rotation of the propeller shaft 35 can be controlled by a conventional propeller shaft brake, not shown, since the details of its structure are not pertinent to the subject invention.

The control requirements for operation of the aircraft using the propeller coupling of the invention are as follows:

1. The propeller shaft 35 is braked, with the blade angle of the propeller 13 in feathered position, and the propeller shaft, through the propeller coupling of the invention, is disengaged during all helicopter type operations.

2. When the pilot desires to use the propeller for forward propulsion, he manually controls disengagement of the propeller brake and manually controls the blade angle of the propeller to allow the propeller to windmill and, in addition, he selects propeller shaft engagement manually as by energizing the solenoid valve 91 through a suitable switch and power circuit, not shown.

3. Hydraulic fluid acting on the clutch actuating piston 63 and spline actuating piston 64 will engage first the disc clutch and then the synchronous clutch and, when the propeller shaft and power turbine shaft speeds are synchronized, considering the gear ratios between these elements, the sliding spline shaft 24 is engaged with the drive shaft 18 to drive the propeller shaft. The disc clutch is then released.

4. When it is desired to return to a helicopter only mode of operation, the pilot manually selects propeller shaft disengagement, as by de-energizing the solenoid valve 91.

5. The disc clutch, as described above, is again applied during spline shaft 24 disengagement with the drive shaft 18 and, following disengagement, the disc clutch is again released.

6. The pilot then manually feathers the propeller blade and the propeller brake is again applied to retain the propeller shaft against rotation.

A clear understanding of the operation of the propeller coupling can best be obtained by reference to the schematic hydraulic fluid circuit of FIG. 4 and the following description.

The operation of the propeller coupling utilizes only signals generated in the transmission assembly plus the pilot operated switch, such as the switch used to energize the solenoid valve 91. In addition, a Pitot pressure is generated in a conventional manner, not shown, such that due to centrifugal force, the Pitot pressure thus generated is proportional to the propeller shaft speed squared. The hydraulic control system, as previously described, consists of three basic valves which determine the porting of high and low pressure hydraulic fluid to the two actuating pistons of the system, that is, to the clutch actuating piston 63 and to the spline actuator piston 64. These valves are the shuttle valve 93 which essentially compares the requested position of the spline actuator piston with its actual position, the pilot operated solenoid valve 91 which in essence provides the spline actuator piston requested signal and, the Pitot pressure actuated valve 92 in which the Pitot pressure, a rough measure of propeller shaft speed, is balanced against the force of spring 110. Valve 92 operates essentially as a shuttle valve and requires a spring 110 with high preload but low spring rate.

Referring now to the operation of the propeller coupling of the invention, FIG. 4 illustrates the normal condition of the various components when the propeller coupling is in a disengaged, nondriving condition. In this condition, the friction clutch plates 45 and 51 of the disc clutch are not in driving engagement with respect to each other, and the spline shaft 24 is not engaged with the drive shaft 18, the spline actuating piston 64 being in the position shown and retained at this position by the lock mechanism of FIG. 3.

After engine start, the valves are as shown in FIG. 4 with the solenoid valve 91, not energized so that as the pump 86 operates, high pressure hydraulic fluid is conveyed via conduits 131, 135 through the uncovered ports 97 and 98 and valve 91 to the conduit 151 to apply high pressure to one end of the spool valve 112 in shuttle valve 93. This high pressure hydraulic fluid is also conveyed through orifice 149 and conduit 148 and passage 84 into the cavity 66 to force the spline actuator piston 64 toward the right, to retain it in the position shown in FIG. 4. Of course, as this pressure builds up in cavity 66, it will also build up in the chamber above plunger 156 to move it and therefore lock pin 157 out of locking engagement with the spline actuator piston. With the spline actuator piston 64 in this position, the vent passage 85 is blocked thereby blocking the vent path from the opposite end of the shuttle valve 93, right-hand end as seen in this figure, thereby causing high pressure hydraulic fluid to be maintained in the right-hand end of this valve resulting in a balanced spool valve position in the shuttle valve, allowing venting of the clutch actuating piston cavity 65.

When the pilot actuates the solenoid valve 91, the valve spool 95 is moved to the right, with respect to FIG. 4, to uncover port 96 while covering port 97 in this valve. At this time, the pilot also manually unfeathers the propeller and regulates the blade angle of the propeller to allow the propeller to begin windmilling toward synchronous speed with respect to the output shaft of the gas turbine engine 10, considering, of course, the gear ratios between these two elements. However, when the propeller speed, as indicated by the Pitot pressure, is well below the synchronous level, this Pitot pressure is insufficient to overcome the biasing action of the spring 110 in valve 92 so that the spool valve 102 of this valve remains in the position as shown in FIG. 4 and thus the pressures to the shuttle valve 93 remain unchanged and the pressures in the cavities 65 and 66 remain unchanged from that described in the proceeding paragraph.

When the propeller shaft is windmilling at a speed approximately proportional to the engine speed, the Pitot pressure will be sufficient to move the spool valve 102 to the right, in terms of FIG. 4, to then place port 107 in communication with port 109 of this valve to permit controlled venting of hydraulic fluid from the cavity 66 through the orifice 149 and permit venting of the left end of the shuttle valve 93. Since the motion of the spline actuator piston 64 is restricted by frictional engagement with the cylinder 61, the vent passage 85 remains blocked for a period of time so that high pressure hydraulic fluid is still applied to the right end of the spool 112 of the shuttle valve 93 to shift it to the left, in terms of FIG. 4, whereby the land e uncovers the passage 115 to allow high pressure hydraulic fluid from conduit 137 to flow through port 113, conduit 147 and 146 and passage 83 into the cavity 65 to force the clutch actuating piston 63 to the left causing the disc clutch to be applied. This delay in applying the disc clutch until the two speeds, that of the propeller shaft and that of the engine output shaft, in this case, drive shaft 18, are within a given range is employed to minimize disc clutch wear.

With the cavity 66 now being vented to effect a reduction of hydraulic pressure therein, the force of spring 71 will now be sufficient to force the spline actuator piston 64 to the left to the position shown in FIG. 2 and, at the same time, the friction driven ring 78 is also moved to the left and is further biased by spring 79 into driven frictional engagement with the friction drive ring 47. Relative rotation between the friction drive ring 47 and the friction driven ring 78, indicating nonsynchronous speeds, produces a reaction force through the helical spline engagement between the friction driven ring 78 and the spline shaft 24 such that when the propeller shaft speed is below turbine speed, that is, the speed of drive shaft 18 is driven by the turbine engine, additional spline actuator piston 64 and spline shaft 24 motion to the left in terms of FIG. 4 is prevented. When these shaft speeds are synchronized, this reaction force disappears and the spline actuator piston with the friction ring 78 and the spline shaft 24 move toward the left, to the position shown in FIG. 2, causing the spline shaft 24 to be in driven engagement with drive shaft 18.

When the spline actuating piston moves toward the left, toward the position shown in FIG. 2, the vent passage 85 is uncovered allowing the right end of the shuttle valve, as seen in FIG. 4, to be vented through the conduits 133 and 145 and vent passage 85, this occurs since the flow of hydraulic fluid from the pump 86 to this end of the shuttle valve is limited by the orifice 132. The spool valve 112 of shuttle valve 93 then returns toward the neutral position with the land e thereon blocking the port 115 to now permit venting of the cavity 65 to release the clutch actuating piston 63 to effect disengagement of the disc clutch.

When the pilot wishes to disengage the propeller, he de-energizes the solenoid valve 91 allowing the spring 99 to force the spool valve 95 back to the position shown in FIG. 4 to uncover the high pressure port 97 and allow hydraulic fluid to flow to the left-hand end of the shuttle valve 93, forcing the spool valve 112 to the right placing the port 115 in communication with the port 118 whereby high pressure hydraulic fluid id again supplied to the piston cavity 65 to re-engage the disc clutch, as previously described. At the same time, high pressure fluid will gradually flow through the orifice 149 to effect movement of the spline actuator piston 64 to the right, effecting disengagement of the spline shaft 24 from the drive shaft 18. The orifice 149 is used to delay the flow of high pressure fluid to the piston cavity 66 so that the disc clutch can be applied before the synchronous clutch is disengaged to minimize side load on the drive spline teeth 22 and 23 during their disengagement.

As the spline actuator piston 64 again moves to the right, to the position shown in FIG. 4, vent passage 85 is again blocked, allowing pressure on opposite sides of the spool valve 112 of valve 93 to become equalized thus shifting the spool valve back to the position shown in this figure wherein the land e thereon blocks the port 115. This allows the clutch piston cavity 65 to be vented, to again release the disc clutch. At the same time, the pilot feathers the propeller causing it to lose rotational speed and the the pilot engages the propeller shaft brake whereby the Pitot pressure is reduced allowing the spool valve 102 to again return to the position shown in FIG. 4 by the biasing action of spring 110 at which time the conditions shown in this figure are again attained.

What is claimed is:

1. A propeller coupling to selectively couple a gas turbine engine to a propeller shaft including a splined input shaft driven by the gas turbine engine, an output shaft operatively connected to the propeller shaft, a splined intermediate shaft operatively connected for rotation with said output shaft and slideably positioned with respect to said splined input shaft for movement between a first position out of splined engagement to a second position in splined engagement with respect to said splined input shaft, a clutch means selectively operable to directly connect said splined input shaft in driving engagement through said clutch means with said splined intermediate shaft and clutch and actuator means operatively connectable to said splined intermediate shaft to effect movement of said splined intermediate shaft between said first position and said second position and driven by said splined input shaft to synchronize the rotational speed of said splined intermediate shaft to the speed of the splined input shaft before completing the movement of the splined intermediate shaft to said second position to effect the splined positive drive engagement between said shafts.

2. A propeller coupling according to claim 1 wherein said clutch means includes a disc clutch having torque input means connected to said splined input shaft and torque output means connected to said splined intermediate shaft, a fluid pressure operated actuator for said disc clutch to effect a clamp-up force between said torque input means and said torque output means, and wherein said clutch and actuator means includes a synchronous clutch having a torque input means connected to said splined input shaft and a torque output means slideably connected to said splined intermediate shaft and, an actuator member for moving said splined intermediate shaft between said first position and said second position and to bias said torque output means of said synchronous clutch into driven engagement with said torque input means of said synchronous clutch.

3. A propeller coupling to selectively couple a propeller shaft to an engine, said coupling including, a driven shaft operatively connected to the propeller shaft, a drive shaft operatively connected to the engine, said drive shaft having drive splines thereon, a spline shaft having driven splines thereon operatively connected to said driven shaft for rotation therewith and slideable axially with respect therefor for movement from a first position with said driven splines thereon out of engagement with said drive splines on said drive shaft to a second position with said driven splines in engagement with said drive splines, a disc clutch means selectively operable to connect said drive shaft in driving engagement with said spline shaft, and, spline actuator means including a synchronous clutch means operatively connected to said spline shaft for moving said spline shaft between said first position and said second position, said synchronous clutch means being operatively connectable to said drive shaft and operable to prevent movement of said spline shaft to said second position until the rotational speed of said spline shaft is synchronized with the rotational speed of said drive shaft.

4. A propeller coupling according to claim 3 wherein said disc clutch means includes a clutch drive ring fixed for rotation with said drive shaft, a clutch driven ring fixed for rotation with said drive shaft, a clutch driven ring fixed for rotation with said spline shaft, a plurality of adjacent friction plates alternately connected to said clutch drive ring and said clutch driven ring for rotation therewith, and means including a fluid pressure operated clutch actuating piston abuttable with respect to said friction plates for exerting a clamp-up force thereon.

5. A propeller coupling according to claim 3 wherein said spline actuator means includes a spline actuating piston means connected to said spline shaft for effecting sliding movement of said spline shaft between said first position and said second position, said spline actuating piston means including spring means to normally bias said spline shaft toward said second position, and wherein said synchronous clutch means includes a spring biased cone clutch driven member having a helical spline engagement with said spline shaft and a complementary cone clutch drive member fixed for rotation with said drive shaft.

* * * * *

PO-1050
(5/69)

UNITED STATES PATENT OFFICE
CERTIFICATE OF CORRECTION

Patent No. 3,679,033                    Dated   July 25, 1972

Inventor(s)      Douglas A. Wagner

It is certified that error appears in the above-identified patent
and that said Letters Patent are hereby corrected as shown below:

Patent Column 2, line 47, after "means", delete
-- in the form of --;

Patent Column 7, line 5, "id" should read -- is --;
and,

Patent Column 8, line 34, after "shaft,", delete
-- a clutch driven ring fixed for rotation with said drive
shaft, --.

Signed and sealed this 9th day of January 1973.

(SEAL)
Attest:

EDWARD M. FLETCHER, JR.                 ROBERT GOTTSCHALK
Attesting Officer                       Commissioner of Patents